(12) United States Patent
Williams et al.

(10) Patent No.: US 7,050,659 B1
(45) Date of Patent: May 23, 2006

(54) OPTICALLY MODULABLE PHOTONIC BANDGAP MEDIUM

(75) Inventors: R. Stanley Williams, Portola Valley, CA (US); Raymond G. Beausoleil, Redmond, WA (US); Wei Wu, Mountain View, CA (US); Zhiyong Li, Palo Alto, CA (US); Philip J. Kuekes, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/096,670

(22) Filed: Mar. 31, 2005

(51) Int. Cl.
*G02F 1/295* (2006.01)
(52) U.S. Cl. ............................ 385/5; 385/14
(58) Field of Classification Search .................. 385/5, 385/14
See application file for complete search history.

(56) References Cited

U.S. PATENT DOCUMENTS

| | | | |
|---|---|---|---|
| 6,160,944 A * | 12/2000 | Payne et al. ................. | 385/129 |
| 6,697,542 B1 * | 2/2004 | Platzman et al. ............. | 385/5 |
| 6,768,850 B1 * | 7/2004 | Dugan et al. ................ | 385/124 |
| 6,813,064 B1 | 11/2004 | John et al. | |
| 6,819,845 B1 | 11/2004 | Lee et al. | |
| 6,870,970 B1 * | 3/2005 | Leonard et al. ............. | 385/122 |
| 6,937,781 B1 * | 8/2005 | Shirane et al. .............. | 385/125 |
| 2002/0146196 A1 * | 10/2002 | Shirane et al. .............. | 385/125 |
| 2003/0107799 A1 * | 6/2003 | Poberezhskiy et al. ........ | 385/1 |
| 2004/0027646 A1 * | 2/2004 | Miller et al. ................ | 359/322 |
| 2004/0033009 A1 | 2/2004 | Soljacic et al. | |
| 2004/0062505 A1 * | 4/2004 | Sugitatsu et al. ........... | 385/131 |
| 2004/0076362 A1 | 4/2004 | Wong et al. | |
| 2004/0184715 A1 | 9/2004 | Platzman et al. | |
| 2004/0258383 A1 * | 12/2004 | Sato et al. .................. | 385/129 |
| 2005/0111775 A1 * | 5/2005 | Fridman et al. ............ | 385/129 |

OTHER PUBLICATIONS

Panoiu, N, et. al., "All-Optical Tunability Of A Nonlinear Photonic Crystal Channel Drop Filter," Optics Express vol. 12, No. 8 1605-1610 (Apr. 19, 2004).
Panoiu, N, et. al., "Ultrafast Optical Tuning Of Superprism Effect In Nonlinear Photonic Crystals," J. Opt. Soc. Am. B 21, 1500 (2004).
Steele, D., "Yu's Research Puts Spotlight On Polymer Chemistry," Univ. Chicago Chronicle, vol. 13, No. 3 (Sep. 30, 1993).
Kim, N., et. al., "Photorefractive Polymer System with a Low Glass Transition Temperature for a Holographic Recording," Bull. Korean Chem. Soc., vol. 23, No. 4 (2002).
Wu, S., et. al., "Thermooptical Properties Of Poly(Methyl Methacrylate)-Based Azobenzene Composites," J. Appl. Polymer Sci, vol. 89, No. 9, (ABSTRACT) (Jun. 12, 2003).
Foulger, S., et. al., "Integration of Photonic Bandgap . . . for Rejection Wavelength Tuning," from www.ces.clemson.edu/comset/pdf/rep_pub13.pdf (Jun. 10, 2002).

* cited by examiner

*Primary Examiner*—Frank G. Font
*Assistant Examiner*—James P. Hughes

(57) ABSTRACT

Controlling the propagation of electromagnetic radiation is described. A photonic bandgap medium is placed in the path of the electromagnetic radiation, the photonic bandgap medium comprising a photorefractive material. Control radiation is projected onto a surface of the photonic bandgap medium. The control radiation spatially varies a refractive index of the photorefractive material to control propagation of the electromagnetic radiation through the photonic bandgap medium.

22 Claims, 6 Drawing Sheets

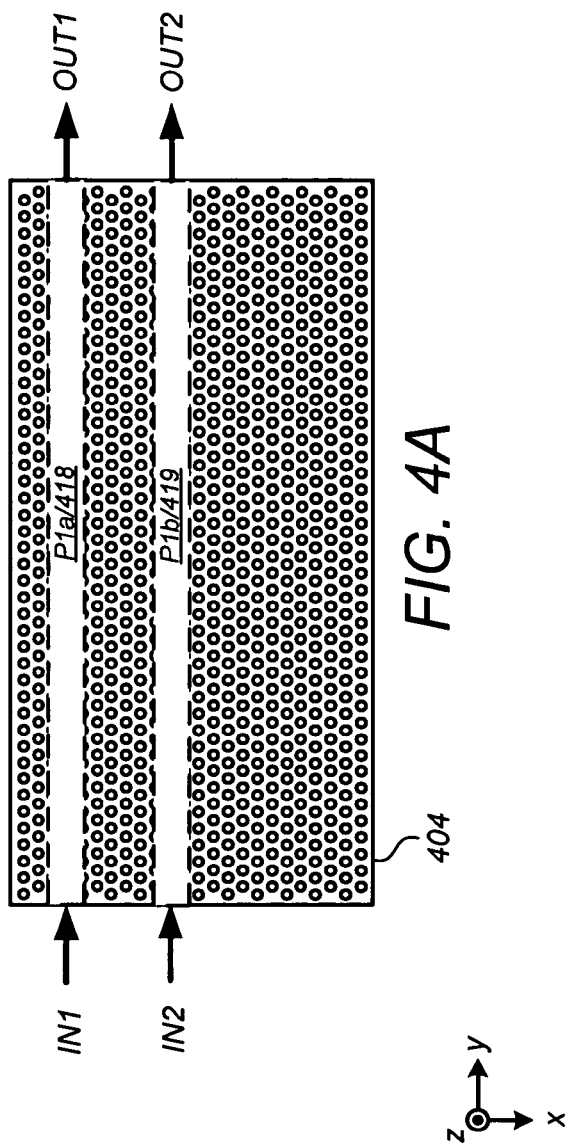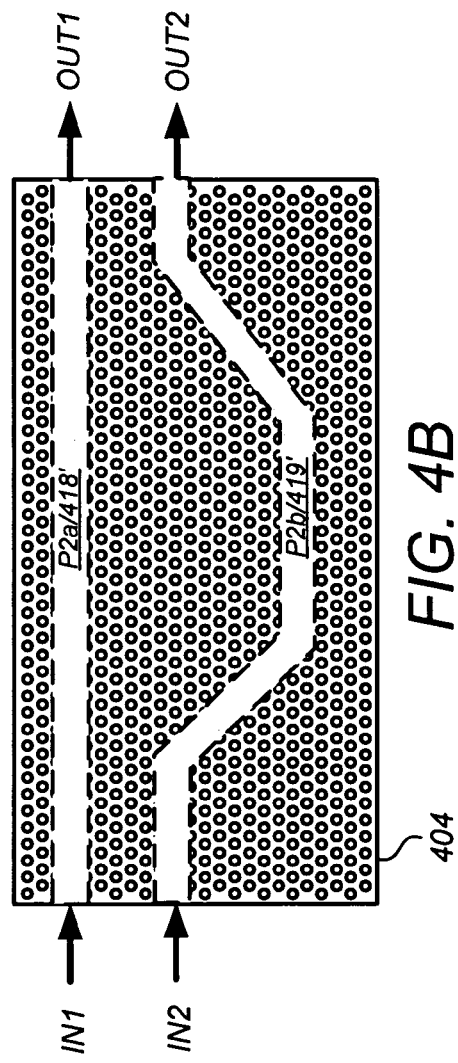
FIG. 4A
FIG. 4B

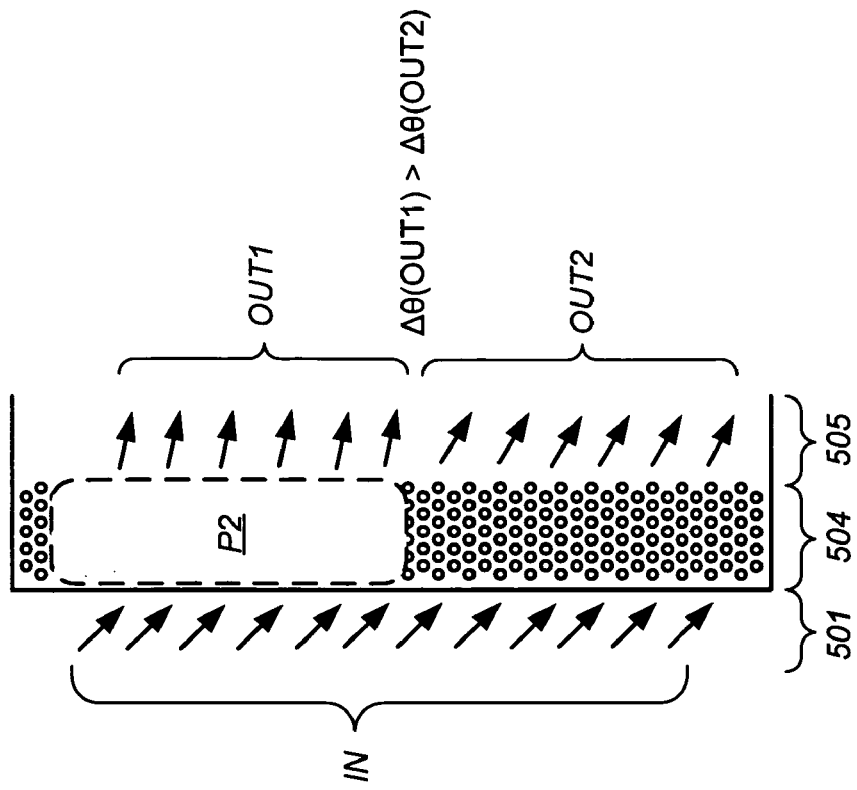
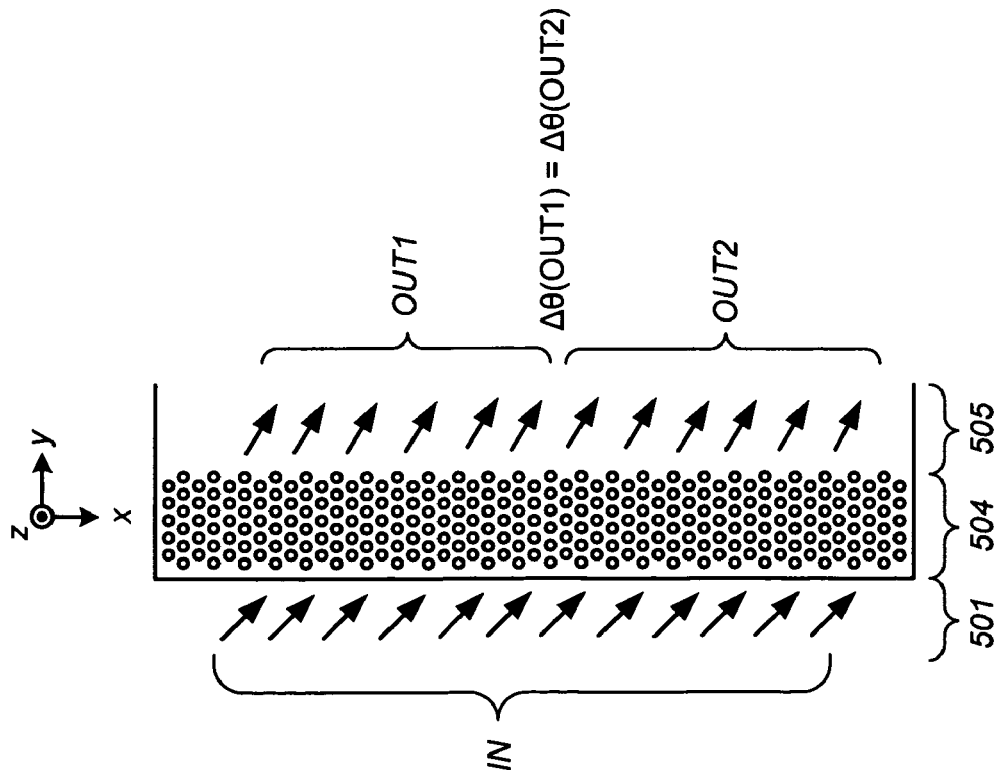

OPTICALLY MODULABLE PHOTONIC BANDGAP MEDIUM

FIELD

This patent specification relates generally to the propagation of electromagnetic radiation and, more particularly, to photonic bandgap media.

BACKGROUND

A photonic bandgap medium comprises an artificially engineered periodic dielectric array having at least one photonic bandgap, i.e., a range of frequencies in which ordinary electromagnetic wave propagation is strictly forbidden. The presence of these photonic bandgaps can be used to confine and guide electromagnetic waves for any of a variety of useful purposes. Guidance and confinement are achieved by the judicious introduction of defect regions, i.e., missing or differently-shaped portions of the periodic array, within which the electromagnetic waves are permitted to exist and wherealong the electromagnetic waves can be confined and guided.

Arrangements have been proposed for modulation of photonic bandgap materials to provide variation in the way incident radiation is propagated by the material. However, issues remain for each such proposal with respect to one or more of spatial resolution, spatial design flexibility, power requirements, and spatial power control. Other issues remain as would be apparent to one skilled in the art upon reading the present disclosure.

SUMMARY

In accordance with an embodiment, a method for propagating electromagnetic radiation is provided, comprising placing a photonic bandgap medium in the path of the electromagnetic radiation. The photonic bandgap medium comprises a photorefractive material. Control radiation is projected onto a surface of the photonic bandgap medium. The control radiation spatially varies a refractive index of the photorefractive material to control propagation of the electromagnetic radiation through the photonic bandgap medium.

Also provided is an apparatus for controlling the propagation of incident radiation. The apparatus comprises a photonic crystal including a photorefractive material. The apparatus further comprises a projection device projecting control radiation onto a surface of the photonic crystal. The control radiation causes a spatial variation of a refractive index of the photorefractive material across the surface of the photonic crystal.

Also provided is a system for controlling the propagation of incident radiation. The system comprises a photonic band gap (PBG) crystal including a photorefractive material. The system further comprises means for projecting control radiation onto a surface of the PBG crystal in a manner that spatially varies a refractive index of the photorefractive material across the surface. Propagation of the incident radiation through the PBG crystal is at least partially controlled according to the spatial variations of the refractive index of the photorefractive material.

BRIEF DESCRIPTION OF THE DRAWINGS

FIGS. 4A and 4B illustrates applying spatial control patterns to achieve a dynamically adjustable path length differential according to an embodiment;

FIGS. 5A and 5B illustrate applying a spatial control pattern to control propagation of incident radiation through a photonic crystal according to an embodiment.

DETAILED DESCRIPTION

Figure 1:
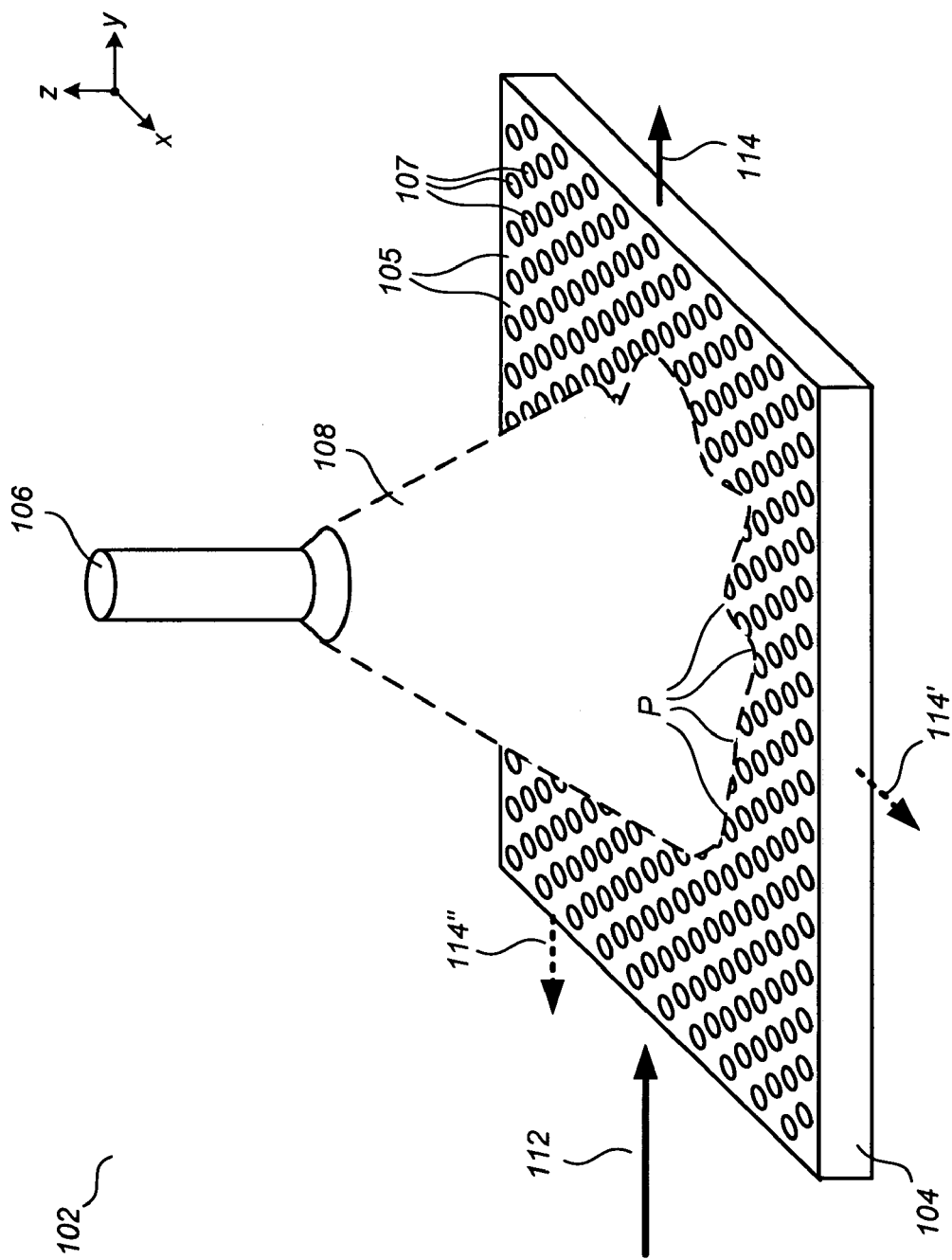
FIG. 1 illustrates a perspective view of an apparatus according to an embodiment.

FIG. 1 illustrates a perspective view of an apparatus 102 according to an embodiment, comprising a photonic crystal 104 and projection optics 106. Photonic crystal 104 comprises a periodic arrangement of a dielectric material 107 and a photorefractive material 105. The photorefractive material 105 may comprise any of a variety of materials in which the refractive index can be varied by application of control radiation. Projection optics 106 projects control radiation 108 onto a surface of the photonic crystal 104, the control radiation 108 causing a spatial variation of the refractive index of the photorefractive material 105 across the surface of the photonic crystal 104. Propagation of incident radiation 112 through the photonic crystal 104 is at least partially controlled according to the spatial variations of the refractive index thereacross. Outputs 114, 114', and 114" are illustrated in FIG. 1 to represent different propagation results for the incident radiation 112 according to different applications of the control radiation.

In one embodiment, the photonic crystal 104 forms a one-dimensional and/or two-dimensional waveguide for facilitating propagation of the incident radiation 112. With reference to the particular coordinate system of FIG. 1, the incident radiation 112 is guided in the x-y plane and vertically confined in the z-direction. In one embodiment, the vertical confinement is achieved by virtue of air layers above and below the photonic crystal 104 having an index of refraction less than that of the photorefractive material 104. In other embodiments, adjacent material layers (not shown) having refractive indices less than that of the photorefractive material 105 may be provided to achieve such vertical confinement.

As illustrated in FIG. 1, control radiation 108 is applied according to a spatial control pattern "P" defining a spatial intensity for the control radiation 108. In one embodiment, the spatial intensity of the control radiation 108 for any particular location (x,y) is binary (e.g., ON/OFF), while in other embodiments the spatial intensity is analog (e.g., continuously variable between a minimum and maximum value). In one embodiment, the spatial control pattern P is static or quasi-static, while in other embodiments the spatial control pattern P is dynamically changing. Depending on the particular characteristics of the photorefractive material 105, modulation of the refractive index can be achieved at a variety of modulation rates ranging from the very modest to the ultrafast. By way of example and not by way of limitation, the photorefractive material 105 may comprise one of a photocarrier-generating semiconductor material, an inorganic Kerr material, an organic Kerr material, and a thermorefractive material.

Examples of photocarrier-generating semiconductor materials include III-V semiconductors such as InP. The presence of photoabsorptively produced carrier densities modifies the material's index of refraction. Preferably, the semiconductor material has a bandgap energy and a corresponding bandgap radiation frequency, and the frequency of the control radiation 108 is at or above that bandgap radiation frequency. The control radiation 108 is absorbed and carriers are created to control the refractive index. Preferably, the incident radiation 112 is at a frequency below the bandgap radiation frequency, and therefore the incident radiation 112 is not absorbed and does not appreciably affect the creation of carriers. Accordingly, propagation of the incident radiation 112 is controlled by the projected control radiation 108. Control of the refractive index of the photorefractive material 105 can be both spatial and temporal, and therefore a wide variety of useful devices can be achieved in accordance with the present teachings.

By way of example and not by way of limitation, an InP material as may be used for the photorefractive material 105 may have a bandgap energy of about 1.34 eV. This corresponds to a bandgap radiation frequency corresponding to a wavelength of 925 nm. The control radiation 108 should be at a frequency higher than the bandgap radiation frequency, i.e., at a wavelength less than 925 nm. The incident radiation 112 should be at a frequency lower than the bandgap radiation frequency, i.e., at a wavelength greater than 925 nm. Advantageously, the rises and falls in local carrier populations responsive to changes in the spatial control pattern P can be very brief, allowing for very fast temporal control of the refractive index.

It is to be appreciated that while the particular example of FIG. 1 shows a photonic crystal 104 having air dielectrics 107 formed within a slab or film of photorefractive material 105, the photonic crystal 104 can be achieved with any of a variety of different periodic configurations of differently-indexed materials, one or both of the materials being sufficiently photorefractive to affect the guiding properties of the photonic crystal 104. For example, in another embodiment, a photonic crystal is provided that is the "inverse" of the photonic crystal 104 of FIG. 1, comprising cylindrical columns of photorefractive material surrounded by air. Any of a variety of other photonic crystal configurations can also be used. Preferably, the ratio of refractive indices of the two materials should be in the range of 2:1 to 3:1 or greater. In the particular example of InP and air, this ratio is roughly 3.17:1.

Examples of inorganic Kerr materials include ZnSe, InSb, and ZnS. Other examples of inorganic Kerr materials include glass having various concentrations of Ti, Pb and Bi ions in the molecular structure. Generally speaking, the photorefractive response of Kerr materials can be characterized by a percentage refractive index change of $n_2 I$, where I is the intensity of the applied control radiation and $n_2$ is a Kerr coefficient for the material, also termed the nonlinear optical Kerr index. Where the Kerr coefficients of such materials is on the order of $10^{-15}$ m$^2$/W, thereby requiring substantial power to cause a modest refractive index change less than a few percent, the use of projection optics is particularly advantageous because a source beam from a modestly-sized laser can be optically reduced to a very small size to achieve the required intensity. The use of such high powers may necessitate that the control radiation be applied in pulses, and therefore the control of the incident radiation would be on a pulsed duty-cycle basis. Nevertheless, modulation based on refractive index change by the Kerr effect, which can be characterized as a non-resonant mechanism, can achieve ultrafast switching speeds even higher that those achievable using carrier-generating semiconducting materials, which can be characterized as a resonant mechanism. Generally speaking, the control radiation power for Kerr materials will be substantially higher than the incident radiation power. Unlike with photocarrier-inducing materials, it is not necessary to place the control radiation in a separate frequency range than the incident radiation when Kerr materials are used. The use of materials having substantially higher Kerr coefficients would further relax the power requirements. Higher Kerr coefficients may be provided by certain organic Kerr materials such as carbazole-substituted polysiloxane sensitized by 2,4,7-trinitro-9-fluorenone with 1-[4-(2-nitrovinyl)phenyl]piperidine added as an optically nonlinear chromophore. Examples of thermorefractive materials include poly(methyl methacrylate)-based azobenzene composites. In an embodiment using a thermorefractive material, a photoabsorptive layer may be placed adjacent to the thermorefractive material to provide heat energy from absorbed photons. Generally speaking, modulation rates using thermorefractive materials would generally be more modest than the other described photorefractive mechanisms.

Figure 2B:
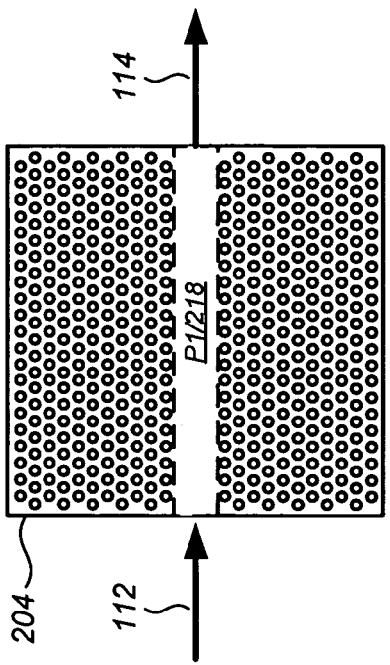
FIGS. 2A–2D illustrate top views of a photonic crystal to which different spatial control patterns are applied according to an embodiment.
Figure 2D:
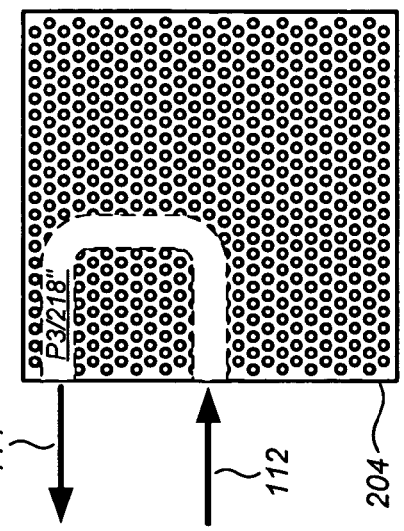
Figure 2A:
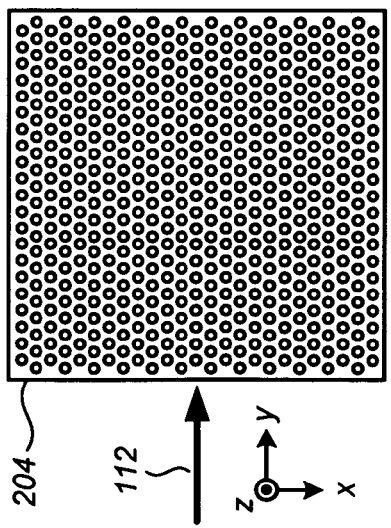

FIGS. 2A–2D illustrate top views of a photonic crystal 204 to which different spatial control patterns are applied according to an embodiment. In one embodiment the photonic crystal 204 does not define an intrinsic defect path therethrough. Stated another way, if no control radiation is applied (termed herein a null control pattern), there is no defect path along which the incident radiation can propagate, the frequency of the incident radiation 112 lying in the photonic bandgap of the photonic crystal 204 for which propagation is forbidden. This is represented in FIG. 2A, which shows the incident radiation 112 but does not show the propagated output radiation.

However, as illustrated in FIG. 2B, when a first control radiation pattern P1 is applied, a first defect path 218 is created along which the incident radiation 112 can propagate to result in the output radiation 114. It is to be appreciated that the photonic crystal 204, which is illustrated as a discrete component for clarity of description, can be integrated into a larger photonic circuit that would further propagate or otherwise process the output radiation 114. Operation is improved where the incident radiation 112 has a frequency lying near a fringe of the intrinsic photonic bandgap of the photonic crystal 204. In such cases, even a very modest percentage change in the refractive index (from sub-one-percent to a few percent, for example) can result in the formation of a defect path that allows propagation of the incident radiation.

Figure 2C:
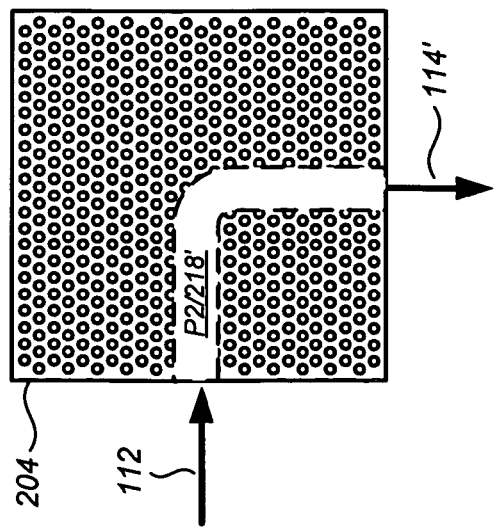

With reference to FIG. 2C, when a second control radiation pattern P2 is applied, a second defect path 218' is created along which the incident radiation 112 can propagate to result in the output radiation 114'. With reference to FIG. 2D, when a third control radiation pattern P3 is applied, a third defect path 218" is created along which the incident radiation 112 can propagate to result in the output radiation 114".

Figure 3A:
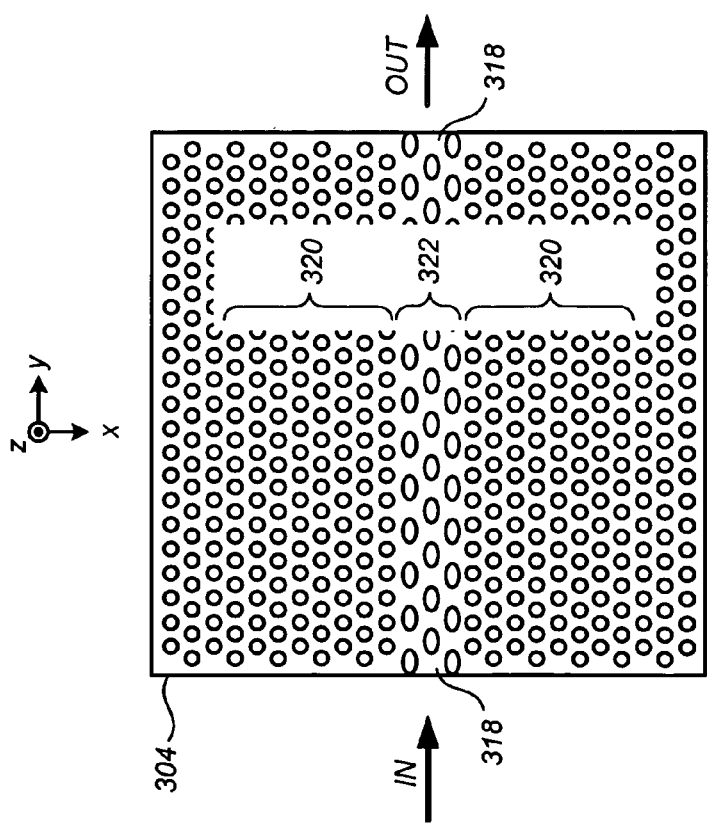
FIG. 3A illustrates a photonic crystal having an intrinsic defect path therethrough.
Figure 3B:
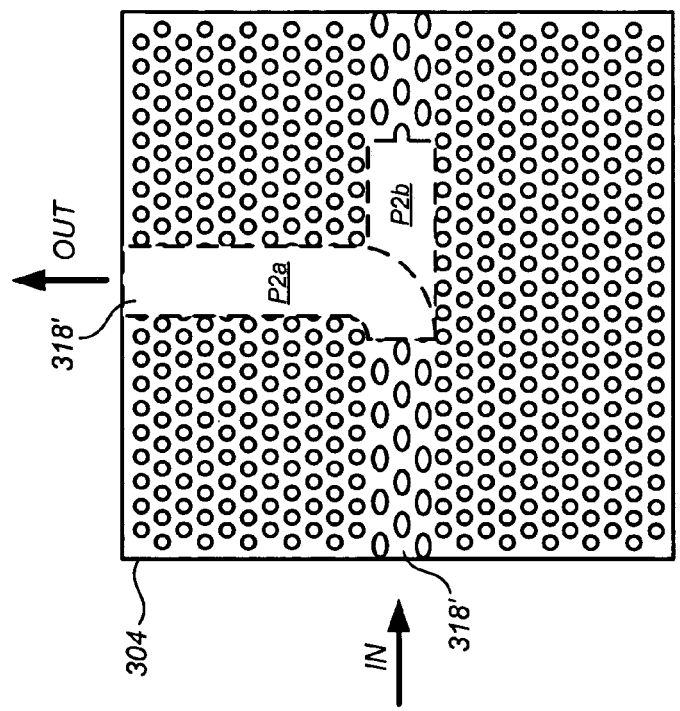
FIG. 3B illustrates the photonic crystal of FIG. 3A to which a spatial control pattern is applied according to an embodiment.

FIG. 3A illustrates a photonic crystal 304 according to an embodiment, comprising a periodic dielectric pattern 320 in which an intrinsic defect pattern 322 is defined therethrough. The defect pattern 322 results in an intrinsic defect path 318 along which incident radiation "IN" is guided. FIG. 3B illustrates the photonic crystal 304 upon application of a control radiation pattern P2a and P2b that neutralizes the intrinsic defect path 318 in favor of a second defect path 318' through the photonic crystal 304. More particularly, a portion P2b of the control radiation pattern is applied to a section of the intrinsic defect pattern 322 such that the photonic bandgap of that section substantially resembles the photonic bandgap of the outlying areas, thereby neutralizing that section of the intrinsic defect path 318. At the same time, a portion P2a of the control radiation pattern is applied in the outlying area to establish a second defect path 318' having a different output location.

Many other combinations and permutations of the embodiments, which can result in a wide variety of useful optical elements, are within the scope of the present teachings. FIGS. 4A–4B illustrate just one of a broad range of examples, wherein spatial control patterns are applied to achieve a dynamically adjustable path length differential. In FIG. 4A, the spatial control pattern P1a and P1b defines the defect paths 418 and 419 such that incident optical signals IN1 and IN2 have identical path lengths to the outputs OUT1 and OUT2. In FIG. 4B, the spatial control pattern P2a and P2b defines defect paths 418' and 419' such that incident optical signals IN1 and IN2 have different path lengths to the outputs OUT1 and OUT2.

FIGS. 5A and 5B illustrate applying a spatial control pattern to control propagation of incident radiation through a photonic crystal according to an embodiment. Incident radiation "IN" having a frequency near the fringe of the forbidden gap arrives at an interface between a first material 501, such as air, and an unmodulated photonic crystal 504. The incident radiation propagates through the photonic crystal 504 into a third medium 505, which may simply be a continuation of the photonic crystal 504 or which may be part of a downstream optical circuit. In FIG. 5A, where no control radiation is applied, first and second portions OUT1 and OUT2 of the propagating radiation emerge at the same angle, while in FIG. 5B, where a control radiation pattern P2 is applied to a section of photonic crystal 504 corresponding to the first portion OUT1, the radiation emerges at different angles. Such variations in refraction angle responsive to different projected control radiation patterns can be harnessed to produce a wide variety of useful devices.

Figure 6:
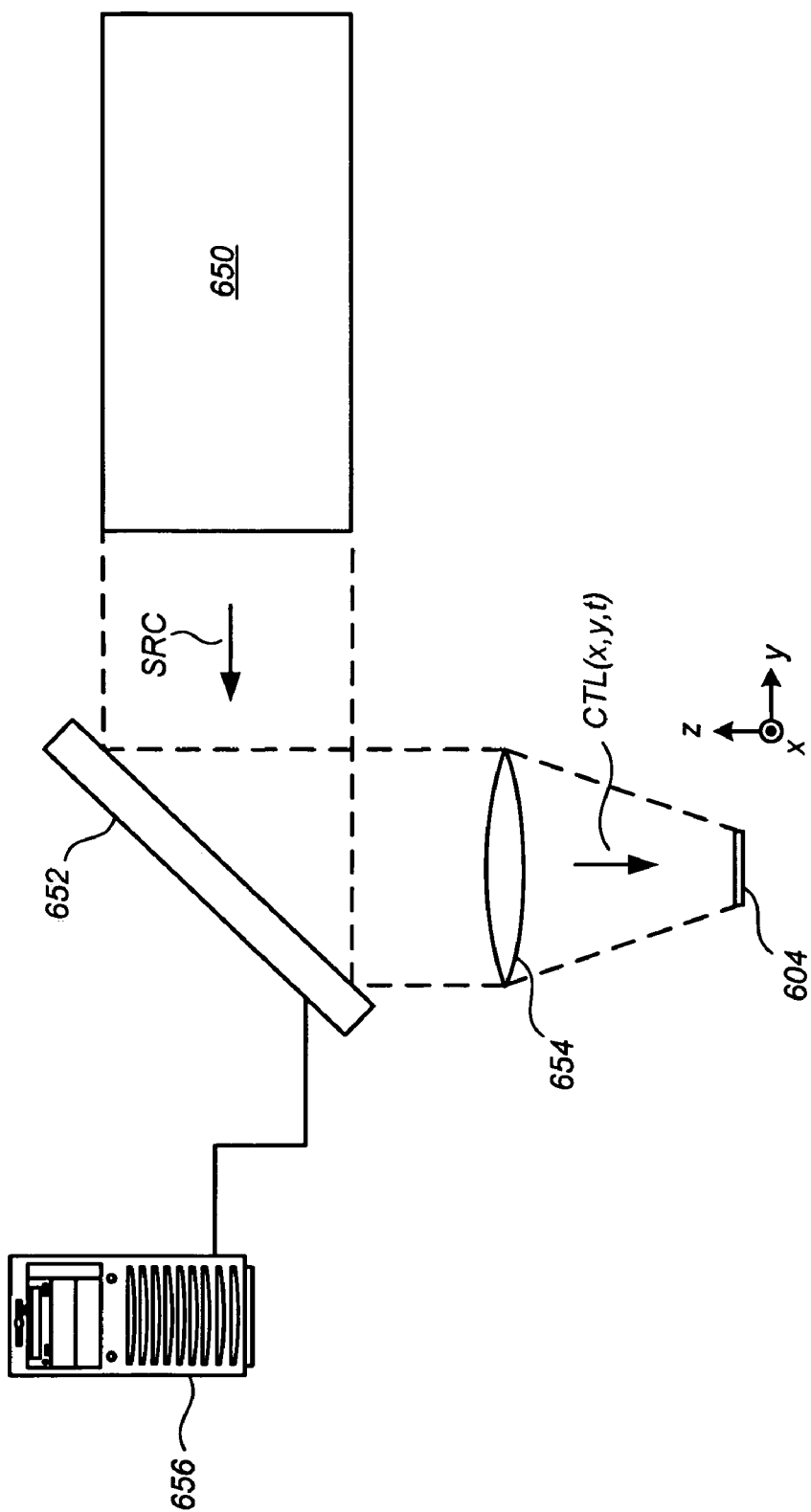
FIG. 6 illustrates a conceptual side view of projection optics including a dynamically controllable spatial modulator applying control radiation to a photonic crystal according to an embodiment.

FIG. 6 illustrates a conceptual side view of projection optics that may be used to apply control radiation to a photonic crystal 604. A laser source 650 produces a source beam SRC that is modulated by a spatial light modulator (SLM) 652, the modulated result being projected onto the photonic crystal 604 using a lens 654 to form a control radiation pattern CTL(x,y,t). In one embodiment, the SLM 652 may comprise a photographic mask or an analog hologram that may be replaced to vary the control radiation pattern. In other embodiments, the SLM 652 is dynamically controllable to provide timewise variation of the control radiation pattern under the control of a controller 656. Any of a variety of controllable spatial light modulators may be used including, but not limited to, liquid crystal light valves, acousto-optical SLMs, Ferro-electric SLMs, and deformable mirror SLMs. In one embodiment, a zoom capability is provided in the projection optics system that allows fast scaling of the applied control radiation pattern, and a deflection capability is provided for fast translation of the control radiation pattern across the photonic crystal surface.

Using projection optics to project control radiation onto a surface of a photonic bandgap material to control propagation of incident radiation therethrough according to one or more of the embodiments can bring about several advantages. First, in at least one of the embodiments, the control radiation pattern can be a truly "analog" pattern not suffering from consequences of pixellation. Second, in at least one of the embodiments, modulation can be achieved using spatial light modulators on a steady, consistent, single-laser source beam, which allows for very fine spatial and temporal tuning of the control radiation pattern. Such fine control capability might be difficult to achieve if a relatively large number of distinct, separately-controlled lasers were used, the distinct lasers being associated with different portions of the photonic crystal. It should be appreciated, however, that the scope of the present teachings is not limited to the use of a single source laser beam. Third, in at least one of the embodiments, the use of projection optics to concentrate a modulated source beam having a relatively large area (e.g. on the order of several millimeters or centimeters across) to a relatively small area (e.g., on the order of hundreds of microns or smaller) provides for substantial concentration of power. In turn, this expands the range of powers that can be applied, and therefore expands the selection of candidate photorefractive materials that can be used. Fourth, in at least one of the embodiments, a substantially uniform photonic crystal is provided that, with a high degree of design flexibility, can be programmably configured. The configurability can be on a one-time basis (e.g., during integration of the device into an overall photonic circuit), a quasi-static basis (e.g., analogous to flashable memory devices), and/or on a dynamic, real-time basis.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, although propagation of optical signals (e.g., infrared, visible, ultraviolet) is one particularly useful application, it is to be appreciated that the scope of the present teachings is not limited to optical signals, but rather can include any type of electromagnetic radiation, ranging from radio frequency radiation and microwaves to x-ray radiation, that can be introduced into a photonic crystal and received or collected after propagating therethrough. By way of further example, while some embodiments supra are described in the context of "two-way" patterned devices, e.g., using (i) a photorefractive material with (ii) air holes, it is to be appreciated that patterns of additional material may be included in the periodic array to form "three-way" patterned devices, "four-way" patterned devices, and so on, without departing from the scope of the present teachings.

By way of even further example, although reversibly-modulable nonlinear materials are used in conjunction with one or more of the embodiments, the use of irreversibly-modulable or "one-time" materials is also within the scope of the present teachings. Thus, in one embodiment, the photorefractive material may comprise a platinum oxide thin film. Application of control radiation can convert the platinum oxide into platinum, the platinum having a different index of refraction different than the platinum oxide. In such embodiment, the photorefractive material is modulated once, the platinum not converting back into platinum oxide upon application of further control radiation. By way of still further example, the photorefractive material may also be photochromic, i.e., changing on color or transparency responsive to application of radiation, without departing from the scope of the present teachings.

By way of still further example, while some embodiments supra are discussed in terms of two-dimensionally extending periodic arrays, the scope of the present teachings is not necessarily so limited. For example, the principles and advantages of the present teachings can be applied in the context of three-dimensional photonic bandgap media. By way of even further example, while particular examples of photocarrier-generating semiconductor materials, organic Kerr materials, inorganic Kerr materials, and thermorefractive materials are presented supra, the use of other nonlinear materials, either currently existing or hereinafter developed, are within the scope of the present teachings. Thus, reference to the details of the described embodiments are not intended to limit their scope.

The invention claimed is:

1. A method for propagating electromagnetic radiation, comprising:
    placing a photonic bandgap medium in the path of the electromagnetic radiation, the photonic bandgap medium having a surface and comprising a photorefractive material; and
    projecting control radiation onto the surface that spatially varies a refractive index of the photorefractive material thereacross to control propagation of the electromagnetic radiation through the photonic bandgap medium;
    wherein said projecting control radiation comprises dynamic spatial modulation using a dynamically controlled spatial light modulator and projection using zoomable projection optics.

2. The method of claim 1, said control radiation being projected onto said surface according to a spatial control pattern such that a defect path is defined in said photonic bandgap medium, the electromagnetic radiation being guided through said photonic bandgap medium along said defect path.

3. The method of claim 2, said photonic bandgap medium having a uniform structure thereacross with no defect path therethrough in an absence of said control radiation.

4. The method of claim 2, further comprising temporally varying said spatial control pattern between a first pattern corresponding to a first defect path and a second control pattern corresponding to a second defect path different than said first defect path.

5. The method of claim 4, wherein said second defect path is a null path, said projection of said second control pattern prohibiting propagation of the electromagnetic radiation through the photonic bandgap medium.

6. The method of claim 4, said photonic bandgap medium being structured to intrinsically define said first defect path therethrough, said first control pattern being a null pattern in which no control radiation is applied, said second control pattern neutralizing said first defect path in favor of said second defect path in said photonic bandgap medium.

7. The method of claim 1, wherein said photorefractive material comprises a Kerr material, and wherein said projecting control radiation comprises optical reduction of a source beam for achieving sufficient optical intensity for said variation of said refractive index.

8. The method of claim 1, said control radiation being projected onto said surface according to a spatial control pattern, further comprising temporally changing said spatial control pattern using a zoom control associated with the zoomable projection optics.

9. The method of claim 1, the photorefractive material comprising a semiconductor having a bandgap energy and a corresponding bandgap radiation frequency, the propagating electromagnetic radiation having a first frequency below said bandgap radiation frequency, the control radiation having a second frequency at or above said bandgap radiation frequency.

10. The method of claim 1, said photorefractive material comprising one of a photocarrier-generating semiconductor material, an organic Kerr material, an inorganic Kerr material, and a thermorefractive material.

11. An apparatus for controlling propagation of incident radiation, comprising:
    a photonic crystal including a photorefractive material; and
    a projection device projecting control radiation onto a surface of the photonic crystal according to a spatial control pattern causing a spatial variation of a refractive index of the photorefractive material across said surface of the photonic crystal;
    wherein said projection device comprises a dynamically controlled spatial light modulator for dynamically controlling said spatial control pattern and zoomable projection optics for zoomably varying a size of said spatial control pattern.

12. The apparatus of claim 11, said photorefractive material comprising a semiconductor having a bandgap energy and a corresponding bandgap radiation frequency, the incident radiation having a first frequency below said bandgap radiation frequency, the control radiation having a second frequency at or above said bandgap radiation frequency.

13. The apparatus of claim 11, said photorefractive material comprising one of a photocarrier-generating semiconductor material, an organic Kerr material, an inorganic Kerr material, and a thermorefractive material.

14. The apparatus of claim 11, wherein said photorefractive material comprises a Kerr material, and wherein said zoomable projection optics uses optical reduction of a source beam for achieving sufficient optical intensity for said variation of said refractive index.

15. The apparatus of claim 11, said control radiation being projected onto said surface such that a first defect path is defined in said photonic crystal medium, the incident radiation being guided through said photonic crystal along said first defect path.

16. The apparatus of claim 15, wherein said projection device is configured to temporally vary said spatial control pattern between a first pattern corresponding to said first defect path and a second control pattern corresponding to a second defect path different than said first defect path.

17. A system for controlling propagation of incident radiation, comprising:
    a photonic band gap (PBG) crystal including a photorefractive material; and
    means for projecting control radiation onto a surface of the PBG crystal according to a spatial control pattern that spatially varies a refractive index of the photorefractive material across said surface, propagation of said incident radiation through said PBG crystal being at least partially controlled according to said spatial variations of the refractive index of the photorefractive material;
    wherein said means for projecting comprises spatial light modulation means for dynamically controlling said spatial control pattern and zoomable projection means for zoomably varying a size of said spatial control pattern.

18. The system of claim 17, said photorefractive material comprising a semiconductor having a bandgap energy and a corresponding bandgap radiation frequency, the incident radiation having a first frequency below said bandgap radiation frequency, the control radiation having a second frequency at or above said bandgap radiation frequency.

19. The system of claim 17, said photorefractive material comprising one of a photocarrier-generating semiconductor material, an organic Kerr material, an inorganic Kerr material, and a thermorefractive material.

20. The system of claim 17, wherein said photorefractive material comprises a Kerr material, and wherein said means for projecting optically reduces a source beam for achieving sufficient optical intensity for said variation of said refractive index.

21. The system of claim 17, said spatial control pattern causing a first defect path to be defined in said PBG crystal, the incident radiation being guided through said PBG crystal along said first defect path.

22. The system of claim 21, wherein said means for projecting temporally varies said spatial control pattern between a first pattern corresponding to said first defect path and a second control pattern corresponding to a second defect path different than said first defect path.

* * * * *